United States Patent [19]
Guy et al.

[11] Patent Number: 5,714,061
[45] Date of Patent: Feb. 3, 1998

[54] APPARATUS FOR TREATING WASTEWATER

[75] Inventors: Monroe Wayne Guy; Raleigh Lee Cox; Christopher Edward Cox, all of Baton Rouge, La.

[73] Assignee: Delta Environmental Products, Inc., Denham Springs, La.

[21] Appl. No.: 599,754

[22] Filed: Feb. 12, 1996

Related U.S. Application Data

[63] Continuation-in-part of Ser. No. 180,122, Jan. 11, 1994, Pat. No. 5,490,935.

[51] Int. Cl.⁶ .................................................. C02F 3/02
[52] U.S. Cl. .......................... 210/195.3; 210/221.2; 210/527
[58] Field of Search ....................... 210/195.3, 221.2, 210/525, 614, 620, 629, 759

[56] References Cited

U.S. PATENT DOCUMENTS

| | | | |
|---|---|---|---|
| 1,337,431 | 4/1920 | Berry | 210/320 |
| 1,381,615 | 6/1921 | Beeby | 210/320 |
| 2,383,302 | 8/1945 | Feinauer et al. | 210/320 |
| 2,901,114 | 8/1959 | Smith et al. | 210/202 |
| 3,057,796 | 10/1962 | Davis | 210/630 |
| 3,495,711 | 2/1970 | Englesson et al. | 210/195.3 |
| 3,796,321 | 3/1974 | Kosonen | 210/202 |
| 3,980,556 | 9/1976 | Besik | 210/6 |
| 3,994,802 | 11/1976 | Casey et al. | 210/5 |
| 4,054,524 | 10/1977 | Mackrle et al. | 210/195 |
| 4,650,577 | 3/1987 | Hansel | 210/195.3 |
| 4,983,285 | 1/1991 | Nolen | 210/197 |
| 5,104,542 | 4/1992 | Dixon et al. | 210/532.2 |
| 5,221,470 | 6/1993 | McKinney | 210/151 |
| 5,565,098 | 10/1996 | Vellinga | 210/195.3 |

*Primary Examiner*—Thomas S. Wyse
*Attorney, Agent, or Firm*—Roy, Kiesel & Tucker

[57] ABSTRACT

An wastewater treatment system is provided. The system includes a cylindrical tank having a sidewall, a bottom, an upper portion and a lower portion. A cone-shaped hopper, open at both ends, is positioned in the tank. The hopper's upper opening is larger than the lower opening. The system includes a compressed air source connected to at least five radially spaced air outlet pipes, each air outlet pipe being fluidly connected to the compressed air source and extending downward into the lower portion of the tank and having an open end positioned above the bottom between the hopper and the sidewall of the tank so as to discharge air into an aeration zone between the hopper and the tank sidewall; an inlet line connected to the tank and having a discharge end opening into the tank between the hopper and the tank sides; and an outlet line having an inlet end positioned within the hopper in the upper portion of the tank and an outlet end exterior of the tank, whereby the wastewater within the tank is continuously aerated through the air outlet pipes with a sufficient volume of air and sufficiently large bubbles such that the wastewater is continuously agitated within the tank exterior of the hopper so as to eliminate any quiescent zones in the upper portion of the tank.

16 Claims, 3 Drawing Sheets

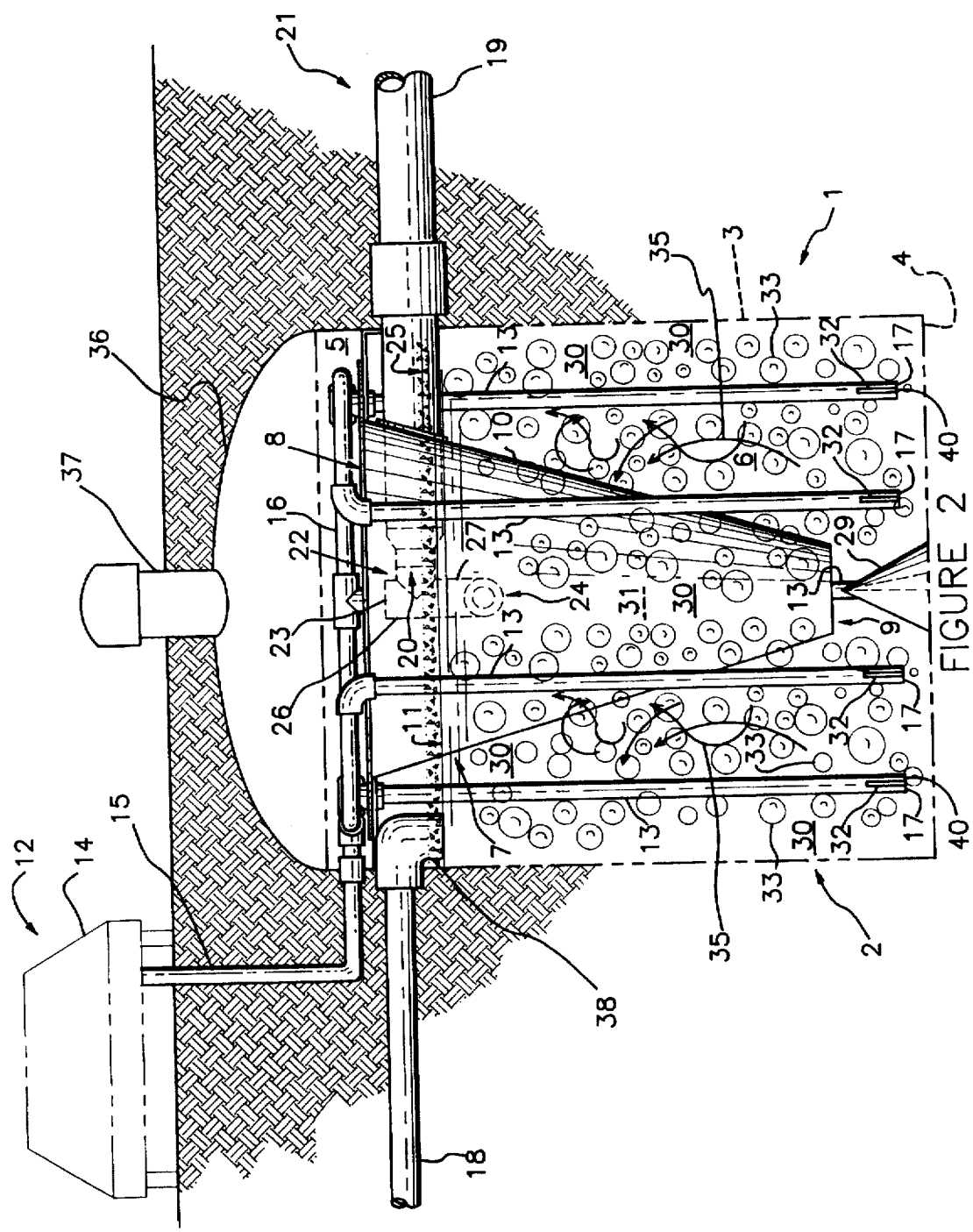

# 5,714,061

APPARATUS FOR TREATING WASTEWATER

CROSS REFERENCES TO RELATED APPLICATIONS

This is a continuation-in-part of application Ser. No. 08/180,122 filed on Jan. 11, 1994, now U.S. Pat. No. 5,490,935.

BACKGROUND OF THE INVENTION

1. Field of the Invention

This invention relates generally to an apparatus for treatment of wastewater and, more particularly, to an apparatus for aerobic treatment of wastewater in a single tank employing an inverted cone clarifier.

2. Prior Art

Relatively small, self-contained wastewater treatment systems are being employed throughout the country for treatment of wastewater from domestic sources, particularly single family dwellings located in areas which are not served by a larger municipal collection and treatment system. Strict federal and state clean water standards have resulted in a proliferation of various units designed to produce an effluent which meets those standards. Most states require stringent testing of treatment systems proposed for sale. A relatively small number of small volume aerobic treatment systems have been approved for sale due to the inability of many units to meet the required effluent standards. By far the most popular and accepted test standard is NSF Standard 40 for individual Aerobic Wastewater Treatment plants (revised in June of 1990), known as "NSF Standard 40", as developed by the NSF Joint Committee on Wastewater Technology.

One popular treatment system design employs a single cylindrical tank having an inverted cone clarifier positioned within the tank with four radially spaced air pipes delivering air into the tank outside of the clarifier, as illustrated in U.S. Pat. No. 4,650,577, invented by Mr. Bradley L. Hansel (hereafter referred to as the "inverted cone system"). The geometry of the inverted cone system has proven to be a cost effective and efficient way to treat domestic sewage. However, even these units and variations on the inverted cone system have had some difficulty meeting NSF Standard 40.

prior art treatment units similar to the inverted cone system have attempted to improve performance by raising the dissolved oxygen content of the wastewater within the tank, thus providing additional support for the aerobic bacteria which feed on the waste. An example of such an attempt can be seen in U.S. Pat. No. 5,221,470, invented by Mr. Jerry L. McKinney. In this system, two air pipes deliver air to the lower portion of the tank and terminate at diffusers, which produce fine bubbles to maximize oxygen transfer to the wastewater. Such systems concentrate on oxygen transfer as opposed to mixing, leaving quiescent zones between air outlet pipes. However, an additional filter was required to attain proper treatment.

Systems can suffer from a loss in treatment efficiency if one or more of the aeration tubes is not functioning. If the bottoms of the aeration tubes are not level one or more of the tubes may not aerate at the desired rate or may not aerate at all. A unit can be unlevel due to improper installation or a unit may be properly installed initially and then get out of level due to settling of soil or other factors. Aeration tubes can also stop aerating because of clogging of the openings with particles or bacteria.

What is needed is an improved inverted cone system which will maintain the basic size of the system while increasing treatment efficiency. What is also desired is a unit which can continue to treat efficiently even though is out of level and which will be resistant to clogging of the aeration tubes.

OBJECTS OF THE INVENTION

It is an object of this invention to provide increased treatment efficiency in an inverted cone wastewater treatment system.

It is another object of this invention to provide increased treatment efficiency in an inverted cone system without the addition of one or more filters to the system.

It is yet another object of this invention to provide increased treatment efficiency in an inverted cone system while minimizing cost increases associated with the increased efficiency.

It is a further object of this invention to provide a treatment apparatus which will operate efficiently even if the unit is out of level.

It is a further object of this invention to provide a treatment apparatus in which the aeration tubes will resist clogging.

SUMMARY OF THE INVENTION

Accordingly, an apparatus and method for treating wastewater is provided including a cylindrical tank with a cone positioned in the tank. The cone is open at both ends with the upper end having the larger opening. The tank has an air compressor which supplies air to at least five air pipes which are radially spaced less than 50 inches apart, with the lower ends of the air pipes positioned near the bottom of the tank in the part of the tank outside the cone. An inlet feeds wastewater into the part of the tank outside the cone and the treated wastewater flows out of the tank through an outlet located inside the cone. The tank is continually aerated with a sufficient volume of air from the air pipes so that large bubbles are created and the wastewater is continuously agitated in the part of the tank outside of the cone. In a preferred embodiment the lower end of each air pipe is open and there is an outlet for air in each air pipe near the open lower end. The outlet is designed so that the system will continue aerating with large bubbles out of all the air pipes even when the unit is not level.

BRIEF DESCRIPTION OF THE DRAWINGS

FIG. 2 is a side view of an embodiment of the invention installed in the ground, with the tank exterior removed for clarity.

DETAILED DESCRIPTION OF PREFERRED EMBODIMENTS OF THE INVENTION

Figure 1:
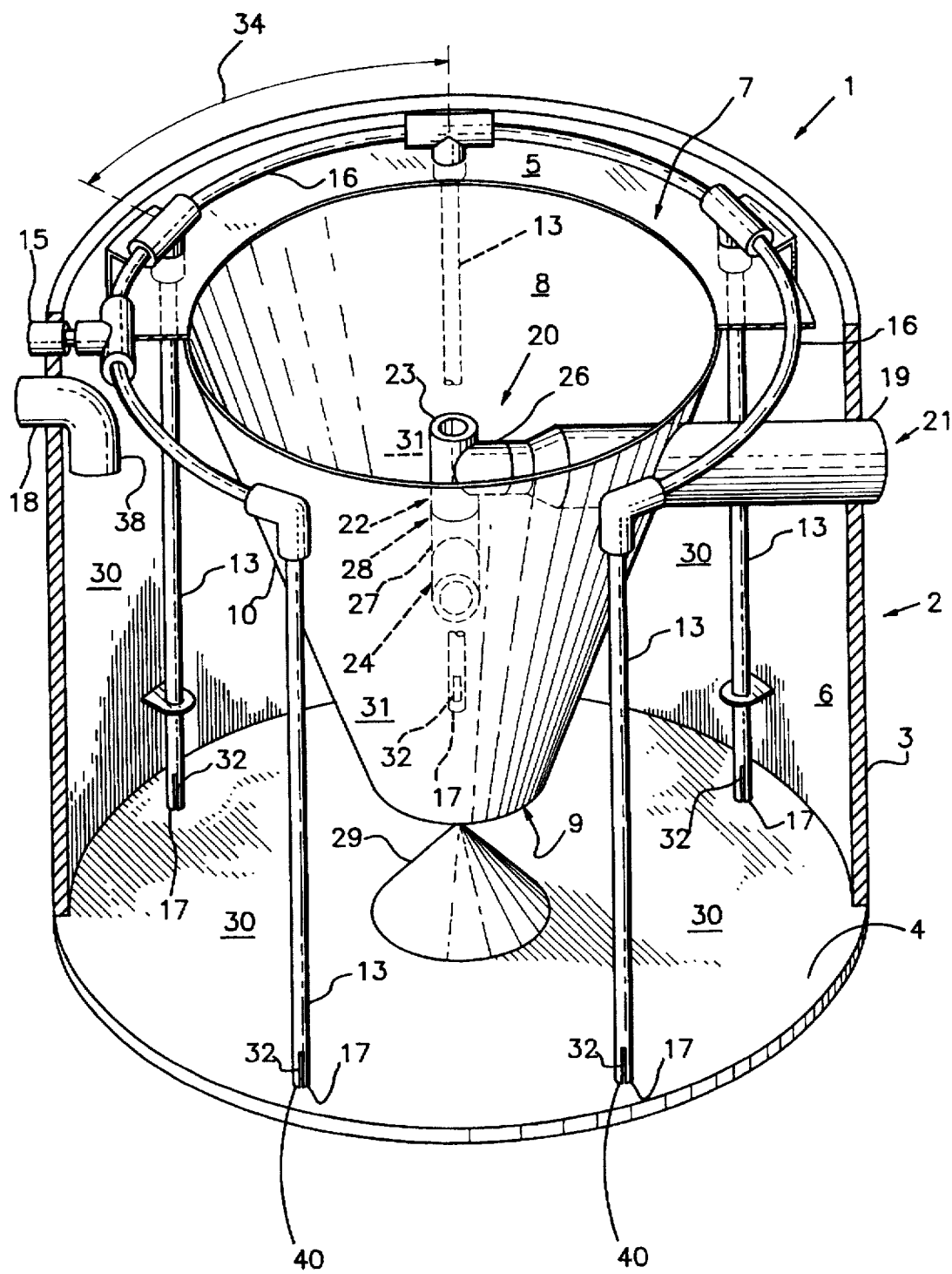
FIG. 1 is a cut-away perspective view of an embodiment of the invention.

As shown in FIGS. 1 and 2, the treatment system 1 includes a cylindrical tank 2 having a continuous sidewall 3, a bottom 4, an upper portion 5 and a lower portion 6. Positioned inside tank 2 is a hopper 7 having an upper opening 8, a lower opening 9 and sides 10 diverging from lower opening 9 to upper opening 8, with upper opening 8 being larger than lower opening 9. Upper opening 8 is located in upper portion 5 above a desired water level 11 in tank 2. A scum blanket 25 of accumulated floatable material may be present and if so floats above water level 11. Lower opening 9 is positioned in lower portion 6 above bottom 4. A deflector 29 may be located on bottom 4 below lower opening 9, as shown. Hopper sides 10 are shown as continuous and conical, but may include other shapes such as a pyramidal shape.

A compressed air source 12, such as air compressor 14, is preferably located exterior of tank 2, and is fluidly connected to a plurality of radially spaced air outlet pipes 13. As shown in FIG. 2, compressor 14 is connected to air outlet pipes 13 by compressor discharge line 15, which is connected to air outlet pipes 13 by header pipe 16. Each outlet pipe 13 extends downward into lower portion 6 of tank 2 and has a lower end 40 positioned above bottom 4 between hopper 7 and sidewall 3. A top 36 is provided to cover tank 2. Sufficient space above scum blanket 25 should be allowed for some freeboard above normal scum buildup. It may be desirable to provide a sealed connection between top 36 and tank 2, allowing a slight pressure buildup in tank 2. An access opening 37 is provided in top 36.

An inlet line 18 is connected to tank 2 as shown, providing wastewater to the system 1, through discharge end 38, between hopper 7 and tank sidewall 3. An outlet line 19 is provided, having an inlet end 20 positioned within hopper 7 in upper portion 5 of tank 2, and an outlet end 21 exterior of tank 2. A vertical pipe 22 is connected to inlet end 20. Typically, vertical pipe 22 is included in a tee connected to inlet end 20. Vertical pipe 22 has an open upper end 23 extending above scum blanket 25 to prevent siphoning, and a submerged end 24 extending below water level 11 to prevent scum blanket particles from being discharged from the system 1. Preferably, vertical pipe 22 is constructed using a first tee 26 connected to inlet end 20 and a second tee 27 connected to the lower end 28 of first tee 26. Outlet line 19 provides an exit for clarified wastewater from the system 1.

A wastewater line, such as a sewage discharge line from a residential dwelling, is connected to inlet line 18 allowing wastewater to fill tank 2 to water level 11. Preferably, compressor 14 is continuously operated so as to discharge air from outlet pipes 13, continuously aerating and mixing the wastewater between hopper 7 and sidewall 3, creating an aeration zone 30 in which bacteria feed on waste within the wastewater. As wastewater flows through the system, aerated wastewater flows through lower opening 9 up into hopper 7, where solids are allowed to settle in a quiescent zone 31 and return to aeration zone 30 through lower opening 9. Clarified water exits the system through outlet line 19.

It has been discovered that mixing within aeration zone 30 is extremely important to proper treatment of wastewater. Prior art emphasis on increased oxygen transfer using diffusers at lower end 40 of outlet pipes 13 de-emphasized mixing together with a trend toward using less outlet pipes 13. The emphasis of system 1 is on mixing and additional outlet pipes 13 were provided to accomplish this mixing. Additionally, diffusion of air discharged from outlet pipes 13 was discouraged by not using diffusers on lower ends 40 and, in a preferred embodiment, by leaving the end of the outlet pipe open so as to form opening 17 at lower end 40.

One can construct each outlet pipe 13 with the end of the pipe open, forming opening 17 as the only outlet. Alternatively, one can construct each outlet pipe 13 with only side air outlets 32. Either embodiment of outlet pipe 13 will be satisfactory so long as it discharges coarse bubbles 33 which rise and each displace a large volume of wastewater, resulting in increased turbulence within aeration zone 30, as shown by arrows 35. It is preferable that the lowest opening on lower end 40 be as close to bottom 4 as possible to ensure complete mixing in aeration zone 30.

In a preferred embodiment side air outlets 32 are slots 41 cut in the lower ends 40 of outlet pipes 13. Ideally, each system 1 will be installed so that the lower ends 40 of outlet pipes 13 are level. However, in actual practice system 1 may be improperly installed and therefore be unlevel, or may be level when installed then become unlevel over time due to settling of the earth surrounding the unit or other factors. If system 1 were out of level and had open ends 17 but not side air outlets 32, the outlet pipes 13 which were the lowest would not aerate because the air would seek an opening with the least water pressure. If one or more outlet pipes 13 do not aerate, the mixing and aerobic treatment effect of those non-performing or sub-performing outlet pipes 13 is lost and treatment efficiency suffers.

Figures 3A, 3B:
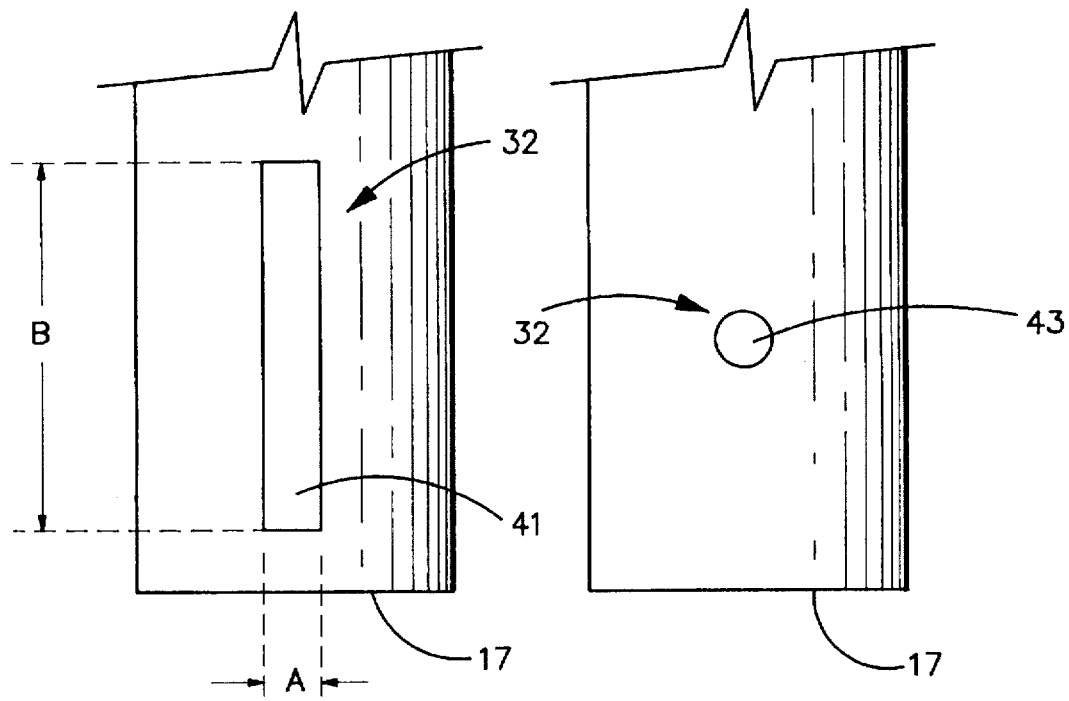
FIGS. 3a and 3b are side views of embodiments of the side air outlets of the invention.

A preferred embodiment of lower end 40 with side air outlet 32 is depicted in FIG. 3a. Shown are opening 17 and slot 41. The inventors have discovered that although a length range (Dimension B in FIG. 2) for the slot embodiment of side air outlets 32 of about 1"-8" is acceptable, a length of about 4" is optimal. Each outlet pipe 13 will have at least one slot at lower end 40 near opening 17.

The width (Dimension A in FIG. 3) of slot 41 can vary between about 0.008" and about 0.125". Slot 41 may extend all the way to opening 17 or, as depicted in FIG. 3, slot 41 may terminate a short distance away from opening 17 so as to prevent slot 41 from deforming over time. In a particularly preferred embodiment slot 41 will be ¼ inch from opening 17. One skilled in the art could also achieve the same result by constructing slots 41 so that they extended all the way to opening 17 and then place a reinforcing ring at opening 17.

Although slots 41 are one preferred embodiment of side air outlets 32, one could also design side air outlet 32 as one or more apertures 43 along the sides of outlet pipe 13 near opening 17, as shown in FIG. 3b. Any particular form of opening would be suitable so long as it extends along the side of outlet pipes 13 and promotes aeration with coarse, large bubbles from side air outlets 32 or openings 17 of outlet pipes 13 even when lower ends 40 are not level.

Side air outlets 32 will ensure that if system 1 is not level the air will continue to flow from all outlet pipes 13. Flow from all outlet pipes 13 is desirable so as to promote mixing and eliminate any quiescent, or non-turbulent, zones in aeration zone 30. The greater the length that side air outlets 32 extend along outlet pipes 13, the greater the tolerance system 1 will have for being out of level. The upper limit on the length will be reached when the bubbles are being created such a distance from bottom 4 that a quiescent zone is formed near bottom 4, which is not desirable. The inventors herein have discovered that it is preferable that the side air outlets 32 extend no more than approximately 8" from the edge of lower end 40.

Figures 4A, 4B, 4C:
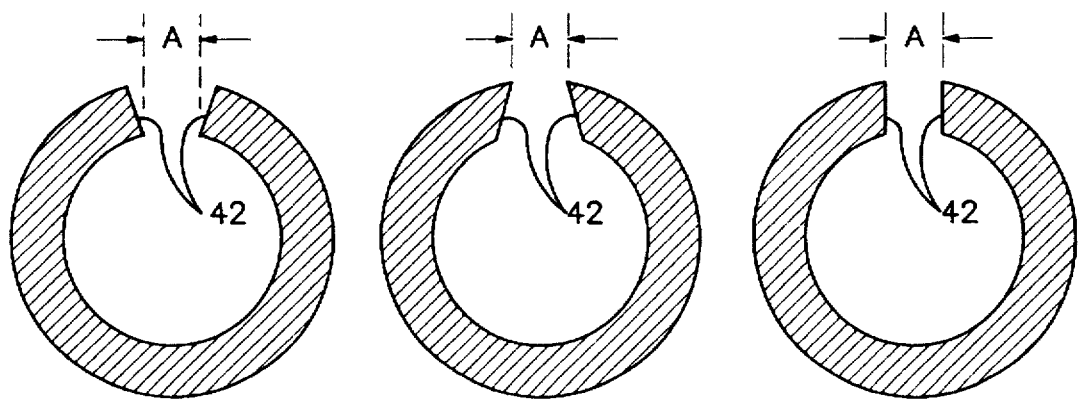
FIGS. 4a, 4b, and 4c are side views of embodiments of the side air outlets of the invention.

Because the growth of bacteria is being promoted within aeration zone 30 and because suspended particles will be present within aeration zone 30, it is desirable to prevent clogging of side air outlets 32 by bacteria and particles. Shown in FIGS. 4a–c are sectional views of lower end 40 which depict three different configurations which may be used for slot 41. Slot walls 42 may be divergent as shown in FIG. 4a, convergent as shown in FIG. 4b, or parallel as shown in FIG. 4c. In the embodiments previously described lower ends 40 of outlet pipes 13 are unitary with the remainder of outlet pipe 13 and are constructed of the same material, PVC Schedule 40 pipe, although any rigid or semi-rigid piping material could be used. In a particularly preferred embodiment lower ends 40 would be constructed of or coated with brass, copper, or zinc, or other materials which inhibit the growth of bacteria.

Although one could construct outlet pipe 13 with only side air outlet 32 and not opening 17, or only opening 17 and not side air outlet 32, it is preferable to have both. If one had only side air outlet 32 outlet pipe 13 would have a tendency to clog over time. Outlet pipes 13 would be especially susceptible to clogging when air compressor 14 were turned off due to servicing of system 1, a power outage, or some other reason. When compressor 14 is off, wastewater with its accompanying particles will fill outlet pipes 13. When compressor 14 is switched on again, if there is no opening 17, side air outlets 32 may be clogged with particles and bacteria as outlet pipe 13 is filled with air and the particles and bacteria are forced out. As discussed above, if one had only openings 17, outlet pipes 13 would not operate if they were unlevel. Therefore, it is preferred that outlet pipes 13 include both side air outlets 32 and openings 17 so as to minimize clogging and allow aeration even when system 1 is not level.

Opening 17 will be below side air outlet 32 and it is preferable that opening 17 have a cross-sectional area substantially equal to or greater than the cross-section area of outlet pipe 13. Although in the embodiments depicted openings 17 are simply the open ends of outlet pipes 13 other openings of similar size could be used so long as they allow the free and unrestricted discharge of particles from outlet pipes 13. For example, opening 17 could be a rectangular opening in the pipe sidewall at lower end 40.

For system 1 with the dimensions described herein, at least five radially spaced outlet pipes 13 should be used, having a spacing of no greater than fifty inches, measured circumferentially along sidewall 3, as shown by dimension arrow 34. Preferably, wastewater should be continuously aerated by substantially continuous flow of air through air outlet pipes 13 in the form of coarse bubbles 33 so as to eliminate any quiescent in aeration zone 30.

It is believed that an additional benefit of system 1 has been discovered. By having a system which is adapted to large bubble agitation throughout the entire tank, even when the system is unlevel, dissolved oxygen levels within aeration zone 30 are lower than previously thought permissible. However, a dramatic increase in treatment efficiency has been observed. It is believed that aerobic bacteria which thrive at lower dissolved oxygen levels, such as filamentous bacteria, are providing increased treatment efficiency. Filamentous bacteria are normally thought to be undesirable due to long tentacles, or filaments, which tend to cause the bacteria to clump together. However, filamentous bacteria provide excellent wastewater treatment.

By using continuous large bubble aeration through all parts of aeration zone 30 even when system 1 is unlevel and by using an increased number of outlet pipes 13, there is sufficient agitation to maintain a uniform mix of filamentous bacteria. It is believed that the proliferation of filamentous bacteria is providing an added filtering effect while efficiently treating the wastewater. Thus, in order to encourage such efficient treatment, it is preferred that system 1 be adapted to provide bubbles 33 which are sufficiently large so as to maintain a maximum average dissolved oxygen level within the aeration zone 30 of less than two milligrams per liter of wastewater, when measured daily over a twenty-eight week period. As the temperature of the wastewater within the tank 2 decreases, the dissolved oxygen content rises. However, once the filamentous bacteria are established and maintained during the warmer months, they appear to survive the higher oxygen content of the colder months. Thus, it is also preferable that system 1 be adapted to provide bubbles 33 which are sufficiently large so as to maintain a maximum average dissolved oxygen level within the aeration zone 30 of less than one milligram per liter of wastewater, when measured daily during a thirty day period when the wastewater in tank 2 has an average daily temperature greater than fifteen degrees Centigrade.

Testing was conducted to determine whether system 1 would meet NSF Standard 40. System 1 included a tank 2 having a diameter of 5'–6", with a water level 11 at a height of 4'–4" from bottom 4. Upper opening 8 of hopper 7 had an internal diameter of 4'–10", and lower opening 9 had an internal diameter of 12". Hopper 7 had a vertical height of 4'–1½". Five air outlet pipes 13 were constructed of ¾" Schedule 40 PVC pipe with the ends open to form openings 17. Outlet pipes were positioned so that opening 17 was 2" above bottom 4 and were spaced approximately 42" apart, measured along the tank sidewall 3. The slot embodiment of side air outlets 32 was used. The slots measured 4" in length and 0.125 in width and extended all the way to opening 17.

Compressor 14 had an output of 1.88 cfm at 2 psi. The system 1 had a daily capacity of 400 gallons/day. The system 1 was subjected to the testing standards of NSF Standard 40. Dissolved oxygen levels were maintained below the thresholds described above by continuous aeration through air outlet pipes 13. The 7-day average for effluent $BOD_5$ ranged from <5 to 14 mg/l, the 30-day averages ranged from 5 to 8 mg/l and the percent removal ranged from 95 to 98 percent, easily meeting the requirements of NSF Standard 40 for effluent $BOD_5$. The 7-day average suspended solids ranged from 5 to 14 mg/l, the 30-day averages ranged from 6 to 8 mg/l and the percent reduction ranged from 96 to 97 percent, again easily meeting the requirements of NSF Standard 40 for effluent suspended solids.

Over the test period system 1 achieved an average TSS of 7 mg/l and an average BOD of 6 mg/l. System 1 was aerated continuously with large bubbles so as to eliminate any quiescent zones within the aeration zone of the unit. The percent reduction of TSS for system 1 was 96%. System 1 was constructed and operated so that the quotient resulting from dividing the flow rate of the wastewater into the tank by the surface area of the wastewater in the clarifier, or hopper, does not exceed 25 gallons per day (GPD) for each square foot of said surface area. In a particularly preferred embodiment of system 1 the quotient is approximately 21.8 GPD per $ft^2$ in the clarifier.

Earlier testing had been performed on a unit based on the design described in U.S. Pat. No. 4,650,577 to Hansel. The Hansel model had less than five aeration pipes, the unit did not have slots in the lower ends of the outlet pipes so as to promote complete mixing when the unit was unlevel, and the unit was operated with only periodic aeration. The average TSS of the effluent from the Hansel model was 22.1 mg/l. The average BOD for the effluent from the Hansel model was 12.2 mg/l. Although the test results for the Hansel model were within NSF standards, the TSS and BOD levels for system 1 were 2–3 orders of magnitude lower than the levels achieved by the Hansel unit. The percent reduction of TSS for the Hansel model was only 87%, as compared to 96% for system 1.

One skilled in the art might expect to achieve only proportionately better results by the addition of a fifth aeration pipe and by continuous instead of periodic aeration. However, the combination of a fifth outlet pipe 13 with side air outlets 32, which allowed for continuous aeration with bubbles sufficiently large enough to eliminate quiescent zones while maintaining certain maximum DO levels, have led to the surprising results detailed above.

Another surprising and additional benefit of the claimed invention is its ability to denitrify. When the effluent of a treatment unit which was slightly larger than system 1 described herein, but which embodied the same proportionate structure, was tested for nitrates, the average level of the nitrates was 1.35 mg/l.

As can be seen, system 1 provides greatly increased treatment efficiency. Although the descriptions herein are based on a specific tank size, it will be obvious to those skilled in the art to make different sized systems which will be proportionate to the claimed invention; and the claims are intended to cover such proportionate systems. Additionally, other embodiments of the invention will occur to those skilled in the art, and are intended to be included within the scope and spirit of the following claims.

I claim:

1. An apparatus for treating wastewater, comprising:

(1) a cylindrical tank having a sidewall, a bottom, an upper portion and a lower portion;

(2) a hopper positioned within said tank, said hopper having sides, an upper opening located in said upper portion at a point above a desired water level within said tank and a lower opening located in said lower portion of said tank below said desired water level, said hopper sides diverging from said lower opening to said upper opening, said lower opening being smaller than said upper opening, said hopper and said tank being adapted such that the quotient resulting from dividing the flow rate of said wastewater into said tank by the surface area of the wastewater in said hopper does not exceed 25 gallons per day for each square foot of said surface area;

(3) a compressed air source;

(4) at least five radially spaced air outlet pipes, each said outlet pipe being fluidly connected to said compressed air source and extending downward into said lower portion of said tank, said outlet pipes having a radial spacing of no greater than fifty inches measured circumferentially along said tank sidewall, each said outlet pipe having a lower end and having a side air outlet positioned above said bottom between said hopper and said sidewall of said tank so as to discharge air into an aeration zone between said hopper and said tank sidewall, said compressed air source and said outlet pipes being adapted to continuously discharge air into said aeration zone, said side air outlets extending along said lower end of said air outlet pipes, said side air outlets adapted such that said outlet pipes will continue to operate when lower ends of said outlet pipes are not level;

(5) an inlet line connected to said tank and having a discharge end opening into said tank between said hopper and said tank sidewall; and (6) an outlet line having an inlet end positioned within said hopper in said upper portion of said tank and an outlet end exterior of said tank.

2. The apparatus in claim 1, wherein said hopper and said tank are further adapted such that the quotient resulting from dividing the flow rate of wastewater into said tank by the surface area of the wastewater in said hopper is about 21.8 gallons per day for each square foot of said surface area.

3. The apparatus in claim 2, wherein each said outlet pipe further comprises an opening at said lower end of said outlet pipe, said opening being lower than said side air outlets and having a cross-sectional area substantially equal to or greater than the cross-section area of said outlet pipe.

4. The apparatus in claim 3, wherein each said air outlet comprises one or more slots extending along said lower end of said air outlet pipe near said opening.

5. The apparatus in claim 4, wherein each said slot has a length ranging from about 1" to 8".

6. The apparatus in claim 4, wherein each said slot has a width ranging from about 0.008" to 0.125".

7. The apparatus in claim 5, wherein each said slot has a width ranging from about 0.008" to 0.125".

8. The apparatus in claim 4 wherein each said slot is no more than 0.25" from said opening in said lower end of said air outlet pipe.

9. The apparatus in claim 3 wherein each said side air outlet comprises one or more apertures along said outlet pipe near said opening.

10. The apparatus in claim 3 wherein each said lower end containing said side air outlet is constructed of a material which inhibits bacterial growth.

11. The apparatus in claim 10, wherein each said air outlet comprises one or more slots extending along said lower end of said air outlet pipe near said opening.

12. The apparatus in claim 11, wherein each said slot has a length ranging from about 1" to 8".

13. The apparatus in claim 11, wherein each said slot has a width ranging from about 0.008" to 0.125".

14. The apparatus in claim 12, wherein each said slot has a width ranging from about 0.008" to 0.125".

15. The apparatus in claim 11 wherein each said slot is no more than 0.25" from said opening in said lower end of said air outlet pipe.

16. The apparatus in claim 10 wherein each said side air outlet comprises one or more apertures along said lower end of said outlet pipe near said opening.

* * * * *